May 26, 1931.  F. C. LEONARD  1,807,040
MIXING VALVE
Original Filed Dec. 28, 1926   2 Sheets-Sheet 1
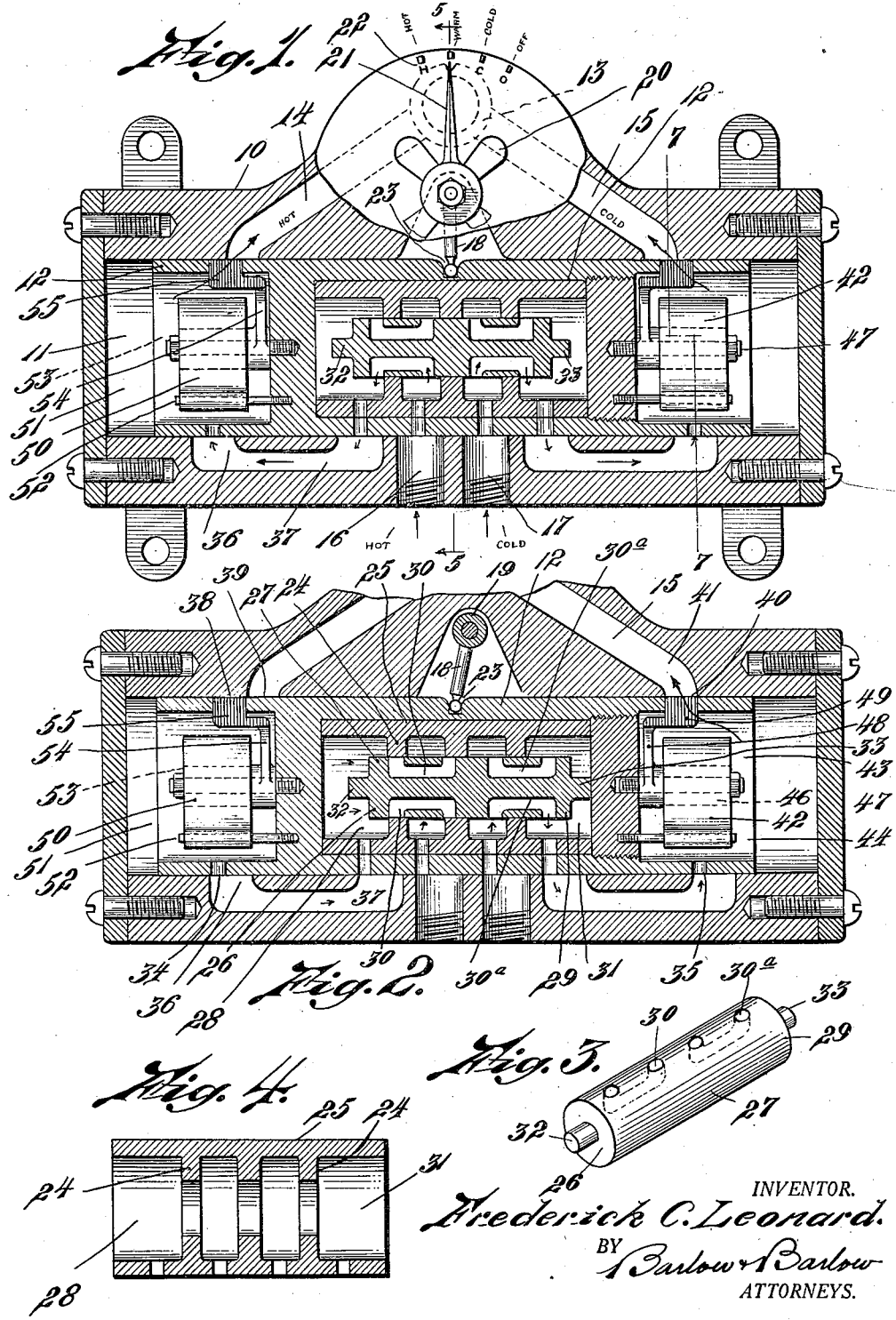
INVENTOR.
Frederick C. Leonard.
BY Barlow & Barlow
ATTORNEYS.

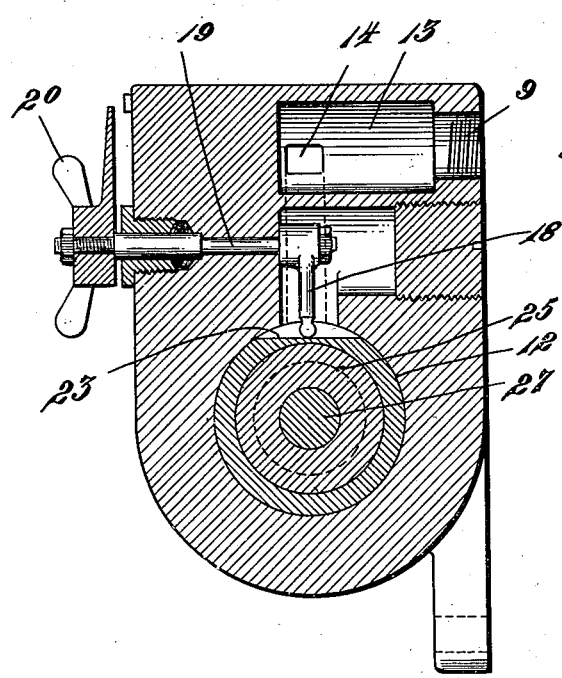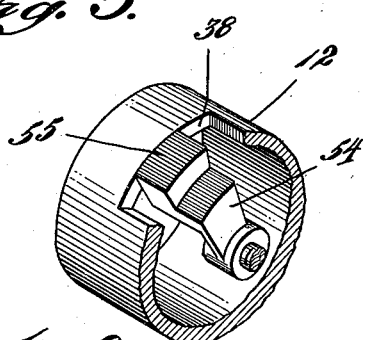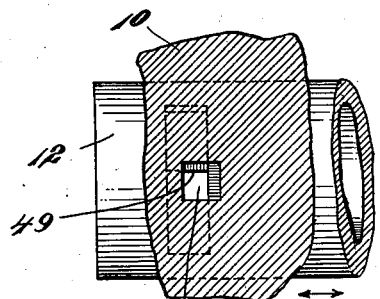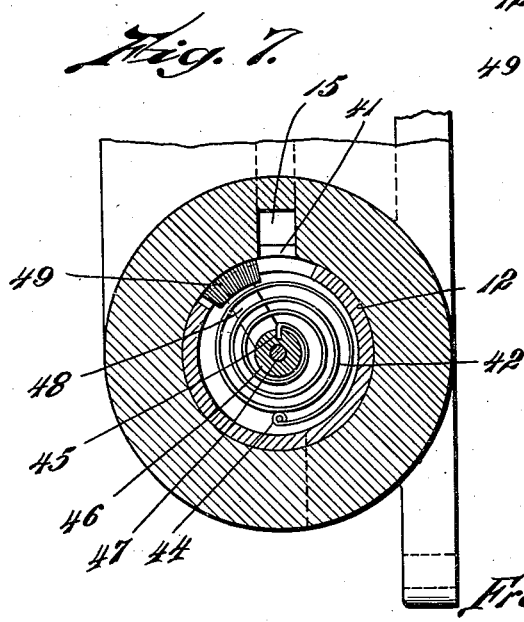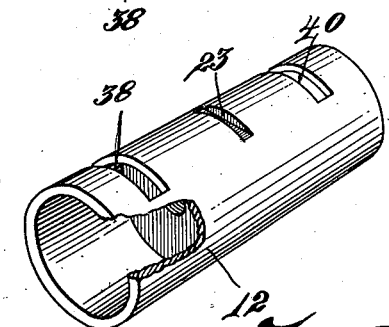

Patented May 26, 1931

1,807,040

UNITED STATES PATENT OFFICE

FREDERICK C. LEONARD, OF PROVIDENCE, RHODE ISLAND, ASSIGNOR TO LEONARD-ROOKE CO., OF PROVIDENCE, RHODE ISLAND, A CORPORATION OF RHODE ISLAND

MIXING VALVE

Continuation of application Serial No. 157,525, filed December 28, 1926. This application filed March 1, 1928. Serial No. 258,260.

This invention is a continuation of my application Serial No. 157,525, filed December 28, 1926, and relates to an automatic controlling valve for mixing fluids of different temperatures; and has for its object to provide a valve of this character having different inlets for fluids of different temperatures such for instance as hot and cold water to be subsequently mixed and discharged from a common opening and to provide a thermally controlled element arranged to be affected by the temperature of one of the inflowing fluids before it reaches the mixing chamber to assist in maintaining a predetermined temperature in this chamber.

A further object of the invention is to provide a manually operable valve to be first set to obtain the desired temperature in the mixing chamber, and to also provide a separate and independent valve operated by a thermal element which is positioned to be actuated by the temperatures of the different entering fluids, and being arranged to control the flow through its inlet port whereby a constant predetermined temperature may be maintained in the mixing chamber after setting the manually movable valve member for the temperature desired.

With these and other objects in view, the invention consists of certain novel features of construction, as will be more fully described, and particularly pointed out in the appended claims.

In the accompanying drawings:

Figure 1 is an elevation partly in section showing my improved device with a manually operable valve member and the two thermally operated control valves.

Figure 2 is the same as Figure 1 but showing the manually operable valve member as moved to cold position.

Figure 3 is a perspective view of the floating pressure control valve.

Figure 4 is a section of the casing or cage for the floating pressure control valve.

Figure 5 is a section on line 5—5 of Figure 1, showing the mechanism for manually operating the slide valve member.

Figure 6 is a top sectional view showing a portion in the casing to illustrate one of the inlet ports therein and to illustrate how the endways movement of the manually operable valve controls this port and also how the lateral movement of the thermally operated valve assists in the control of this inlet port opening.

Figure 7 is a section on line 7—7 of Figure 1 showing one of the thermostats as positioned to operate its valve independently of the movement of the manually operable valve.

Figure 8 is a perspective view of the hand operated valve.

Figure 9 is a perspective view of the thermally controlled valve positioned to control the opening through the manually controlled valve.

It is found in practice that the usual automatically controlled mixing valve of this general character wherein a single thermostat is positioned in the mixing chamber for controlling the inlet ports or passageways for both the hot and the cold fluids, when the temperature of the fluid in this chamber begins to fall slightly the thermostat therein is delayed in its action until an excessive amount of hot fluid has been admitted and then when the thermostat begins to act it goes beyond and admits an excessive amount of cold fluid and so oscillates back and forth admitting first a little too much cold and then a little too much hot requiring some time before it reaches a proper balance. In the meantime, the temperature of the mixing chamber is varied first one way and then the other more than is desired.

To obviate this difficulty, I have provided a valve operated by a thermal element which is positioned to be affected by the inflowing hot fluid before it reaches the mixing chamber, thereby rendering its action much more sensitive, for instance to control the temperature of water for a shower bath or the like if the temperature of the hot water in the supply changes for any reason, this change in temperature immediately acts upon the thermostat positioned in the hot water supply to partially close the inlet valve to the mixing chamber and so reduce the supply of hot water without affecting the full flow of cold water and thus the temperature of the mixture is maintained with the minimum amount of fluctuation.

By my improved valve structure, I may also provide a second independently operated thermostat in the cold water supply to work in conjunction with the thermostat in the hot water conduit so that if for any reason the temperature of the cold water should rise this thermostat will act upon a valve or closure member to open it and admit more cold water and when the temperature falls this valve is moved to admit less cold water and in this way the two thermostats located in the hot and in the cold water supplies cooperate to maintain a substantially constant temperature in the mixing chamber. The two thermostats are in separate outer chambers or conduits to which the untempered hot and cold waters are admitted from different sources, the cold to one and the hot to the other and on these thermostats the waters of different temperatures act to cause movement of their respective valves and so control the flow of these waters of different temperatures to the common mixing chamber in temperatures and quantities to obtain the required temperature in this mixing chamber. The temperature changes in these different outer chambers or conduits may be extreme for instance in the hot water chamber the changes may be anywhere between 100° and 200° while in the mixing chamber the changes are relatively close such as from 1° to 2°. Therefore, it will be seen that by placing the thermostat in the outer chamber or conduit thermostatic coils may be employed of a less diameter which are more powerful and accurate than was possible to obtain where the temperature control thermostat was positioned in the mixing chamber.

In other words, by locating the thermostats in the outer conduit they control the number of heat units to enter the mixing chamber and not alone the quantity of water to enter that chamber, as of course a small quantity of very hot water is equal to a larger quantity of cooler water in order to obtain the desired number of heat units in this mixing chamber which theoretically is supposed to be constant; at any setting of the manually-operable valve and the following is a detailed description of the present embodiment of my invention and showing one means by which these advantageous results may be accomplished.

With reference to the drawings, 10 designates the valve casing which is herein shown as being elongated and provided with a central bore 11 in which is mounted an endways manually operable movable piston type of valve member 12. A mixing chamber 13 is formed in an upwardly extending portion of the casing to which hot water is admitted through the passageway 14 and cold water is admitted by way of the passageway 15, said chamber having a common outlet 9, see Fig. 5, the lower part of the casing shows the main hot water inlet 16 and the main cold water inlet 17, each of which supplies its respective passageway 14 or 15, which supply is controlled by an endways movement of this piston valve 12, next described.

The piston-shaped valve 12 is mounted to slide endwise in the cylindrical bore 11 and is arranged to be manually actuated through the arm 18 on the inner end of shaft 19, on the outer end of which shaft is mounted the spoked hand wheel 20 and a pointer 21, the latter being moved over the graduated indications at 22 on the face of the casing to indicate to what point the hand wheel 20 is to be moved in order to obtain the desired temperature of water in the mixing chamber. This piston valve 12 is slotted transversely as at 23 to receive the operating arm 18 whereby the rotation of the hand wheel 20 imparts a longitudinal movement to this valve member 12.

This valve 12 is herein shown as being in cylindrical form and in its center portion is mounted a floating balanced pressure control or equalizing valve 27 of cylindrical shape which is mounted to slide endways in the three partitions 24 of its cage 25. In the body of this valve are formed a pair of hot water inlet passageways 30, and a pair of cold water passageways 30ª. One end 26 of this floating valve extends through one end partition 24 into the hot water chamber 28 while the opposite end 29 extends through the opposite end partition 24 into the cold water chamber 31, whereby when the pressure of water in one of these chambers exceeds the pressure of water in the other chamber the valve is moved towards the side of least pressure to equalize the pressure of the incoming hot and cold water in these two chambers. Stop bosses 32 and 33 are formed on the ends of this valve member to limit its movement in either direction.

This piston valve is provided with inlet ports 34 and 35 which are of a size smaller than the corresponding port 36 in the passageway 37 and the same is true of the ports in the cold water side.

On the upper side of this piston valve a port 38 is formed preferably of a width to correspond to the width of the inlet port 39, and on the opposite end of this piston valve a corresponding port 40 is formed of a width equal to that of the inlet port 41 so that by a longitudinal movement of this piston valve the inlets through these hot and cold water ports are controlled to admit the required amount of both hot and cold water to obtain the desired temperature in the mixing chamber 13. For instance, if the temperature of the hot water supply is 150° and the temperature of the cold water 50° then with an equal supply of each the temperature in the mixing chamber will be approximately 100° and any desired variation in this temperature may be controlled by a manual movement of this piston valve 12 through handle 20 to vary the relative flows of hot and cold water to this chamber.

It is found in practice that the temperature of the hot water supply to this valve varies materially due to many causes, such for instance, as an unusual draft upon the hot water supply pipe and these changes in temperature materially affect the temperature of the mixture in the chamber; also in some instances, due to similar causes, the temperature of the cold water supply will vary altho usually these fluctuations are much less violent than that of the hot water supply; and to compensate for these changes, I have provided a thermostat 42 preferably in coil form and have mounted the same in a recess or outer chamber 43 in the cold water end of the piston 12, one end of this thermostatic coil being fixed to the pin 44 while the opposite end 45 is secured to the sleeve 46 mounted to rotate on the central pin 47 and to this sleeve 46 is connected an arm 48 which extends outwardly to support the closure valve member 49 to swing on an arc of a circle and control the port opening 41 into the passageway 15, whereby any change in the temperature of this water causes valve member 49 to move to admit more or less of this cold water relative to the amount of hot water which is entering through the casing port 39. A similar effect is produced upon the thermostatic coil 50 located in the recess or outer chamber 51 on the opposite or hot water end of the cylindrical valve 12. One end of this thermostatic coil being secured to the pin 52 while the opposite end is attachd to the sleeve 53, which sleeve is connected thru the arm 54 to the closure or valve member 55, whereby any change in temperature of the hot water as it is flowing into the mixing chamber affects the action of this thermostat to rotate this sleeve to either open or close the valve 55 and so nicely control the quantity of hot water to be admitted by the thermal unit to control the temperature in the mixing chamber 13.

It will be noted that the movement of these thermally controlled valves is in a direction at right angles to that of the hand operated cylinder valve 12 so that after the hand operated valve has been moved and set to obtain the desired temperature in the mixing chamber, the temperature of both the hot and cold supply act upon their respective thermostats to independently and automatically control the quantity of thermal units of each supply before they reach the mixing chamber and so maintain a much more constant temperature in this chamber than is possible where a single thermostat is positioned in the mixing chamber to control both supplies.

I have shown and described a valve actuated by a thermal element to control the flow through each of the conduits to the mixing chamber, but in some instances, satisfactory results may be obtained by thermally controlling but one of the inlet conduits, and that with or without the use of a manually operable valve for either one or both of said conduits.

My improved automatic control valve is very simple and practical in construction and is effective in its operation and by its use the supply of water or fluid of any other character of different temperatures may be automatically controlled.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a mixing valve, a casing, a mixing chamber therein, separate conduits in said casing for fluids of different temperatures leading to said chamber, a thermal element positioned to be affected by the temperature of the fluid in one of said conduits before it reaches said chamber and a valve mechanically actuated by said element for controlling the quantity of flow through its conduit to said chamber.

2. In a valve for mixing fluids of different temperatures, a mixing chamber, separate conduits for the hot and the cold fluids communicating with said chamber, and thermal elements positioned to be affected by the temperature of the fluid in each of said conduits for controlling the quantity of flow through each conduit to said chamber.

3. In a mixing valve, a casing, a mixing chamber therein, separate conduits in said casing for conducting fluids of different temperatures to said chamber, a valve for controlling the supply flow through one conduit, an auxiliary closure member in another conduit, and a thermal element actuated by the changes in the fluid temperature in the second conduit to actuate said closure member and control the flow through the second conduit to said chamber.

4. In a mixing valve, a casing having a mixing chamber therein, separate conduits in said casing leading to said mixing chamber for conducting fluids of different temperatures thereto, a manually operable valve for controlling the supply flows through said passageways, an auxiliary valve arranged to cooperate with the manually operable valve to assist in controlling the flow through one of said passageways, and a thermostat affected by the temperature of the supply fluid before it enters said chamber mechanically connected to said auxiliary valve.

5. In a mixing valve, a casing, inlets therein for fluids of different temperatures, a mixing chamber therein, manually operable means for controlling the flow of the fluids of different temperatures from said inlets to said chamber and thermally controlled means interposed between one of the fluid inlets and said chamber for gradually increasing or decreasing the quantity flow from its inlet to said chamber.

6. In a mixing valve, a casing, inlets therein for fluids of different temperatures, a mixing chamber therein, manually operable means in said valve for controlling the flow of the fluids of different temperatures from said inlets to said chamber, and thermally controlled means in said valve interposed between one of the fluid inlets and said chamber for gradually increasing or decreasing the quantity flow from its inlet to said chamber.

7. In a valve for mixing fluids of different temperatures, a casing, a mixing chamber, therein, conduits therein for conducting hot and cold fluids to said chamber, a manually operable valve member for first obtaining a mixture of fluids of the desired temperature in said chamber, and a thermostat positioned to be affected by the temperature of the fluid in one of said conduits before it reaches said chamber for controlling the flow through said conduits for said fluid to said chamber.

8. A mixing valve having a mixing chamber provided with inlets for fluids of different temperatures, a hand operated valve for controlling all of said inlets and a supply thermally controlled valve for each inlet affected by the temperature of the supply fluids before they enter for operating said valves and controlling the fluid flow to said chamber.

9. In a valve for mixing waters of different temperatures, hot and cold water conduits, a mixing chamber, a manually operable member to be set for first obtaining a relative flow of both hot and cold water through said conduits to said chamber to obtain the desired temperature in the chamber, and a thermostat in each of said conduits each being influenced by the change of water temperature in its conduit for controlling the relative flows therethrough to the mixing chamber.

10. A mixing valve comprising a casing, a mixing chamber in the casing, hot and cold water passageways leading to said chamber, a manually operable plunger valve in the casing controlling the flow of fluid through said passageways to obtain the desired temperature of mixture in said chamber, auxiliary cooperating closures for said passageways, and thermal elements acting on said auxiliary closures to assist in controlling the flow of fluid to said chamber.

11. A mixing valve comprising a casing, a mixing chamber in the casing, hot and cold passageways leading to said chamber, a manually operable plunger in said casing controlling the flow of fluid through said passageways, movable closures in each of said passageways, and cooperating thermal elements carried by said plunger and acting on said closures to control flow in said passageways.

12. A mixing valve comprising a casing, a mixing chamber in said casing, hot and cold water conduits leading to said chamber, a manually operable longitudinally slidable valve member in said casing controlling said conduits and adapted to be first set to control the relative flow of hot and cold water to said chamber, and a laterally movable thermally controlled closure member in one conduit having a movement independent of that of said slide valve.

13. In a mixing valve, a mixing chamber, separate passageways for hot and cold water leading to said chamber, a manually operable endways movable valve member for controlling said passageways, a pair of independently operable thermostats carried by said valve member and affected by the different temperatures of water in the different passageways and auxiliary closure members controlled by action of said thermostats to regulate the flow and so maintain a constant temperature in said chamber.

14. In a mixing valve, a mixing chamber, separate passageways for hot and cold water leading to said chamber, a manually operable endways movable valve member for controlling said passageways, a pair of independently operable thermostats carried by said valve member and affected by the different temperatures of water in the different passageways and auxiliary closure members controlled by action of said thermostats to move in a direction at right angles to that of said valve member to regulate the relative flow through said different passageways to maintain a constant temperature in said chamber.

15. In a mixing valve, a casing, a mixing chamber, passageways for hot and cold fluids communicating with said chamber, a manually operable endways movable cylindrical valve member arranged to control said passageways, independent closure members for said passageways, a pair of independently operable thermostats carried by said valve member and arranged to move said closure members in a direction at right angles to the movement of said valve member to control the flow through their respective passageways and so maintain a constant temperature in said chamber.

16. In a valve for mixing fluids of different temperatures, a mixing chamber, separate conduits for the hot and the cold fluids communicating with said chamber, thermostats positioned to be affected by the temperature of the water in each of said conduits for controlling the quantity flow through each conduit to said chamber, and a pressure actuated valve for controlling the quantity flow into said different conduits.

17. In a valve for mixing water of different temperatures, hot and cold water conduits, a mixing chamber, a manually operable member to be set for first obtaining a relative flow of both hot and cold water through said conduits to said chamber to obtain the desired temperature in the chamber, a thermostat in each of said conduits each being influenced by the change of water temperature in its conduit for controlling the relative flows therethrough to the mixing chamber, and an automatically actuated valve controlled in its action by the differential pressures in said conduits for controlling the fluid flow to said conduits.

18. In a mixing valve, a casing, a mixing chamber therein, separate conduits therein for fluids of different temperatures leading to said chamber, a valve for controlling one of said conduits, and a thermal element positioned to be affected by the temperature of the fluid in said conduit and connected to said valve to move the same proportionally to the change of temperature of the fluid.

19. In a mixing valve, a casing, a mixing chamber therein, separate conduits therein for fluids of different temperatures leading to said chamber, a valve for controlling one of said conduits, a thermal element positioned to be affected by the temperature of the fluid in said valve controlled conduit, and means for connecting said element to said valve to move the same proportionally to the change in temperature of the fluid.

20. In a mixing valve, a casing, a mixing chamber therein, separate conduits therein for fluids of different temperatures leading to said chamber, a valve for controlling one of said conduits, and means responsive to a change of temperature of the fluid in said conduit for gradually moving the valve to permit an increase or decrease of the flow of fluid therethrough.

21. In a mixing valve, a casing, a mixing chamber therein, separate conduits in said casing for conducting fluids of different temperatures to said mixing chamber, valve means for varying supply flow through one conduit, valve means for varying supply flow through a second conduit, and means responsive to temperature variations in said second conduit for regulating the valve means for said second conduit in accordance with said temperature variations.

22. In a mixing valve, a casing, a mixing chamber therein, separate conduits therein for conducting fluids of different temperatures to said mixing chamber, a manually operable valve for controlling fluid supply through said conduits, an auxiliary valve in one conduit, and means responsive to temperature variations in the conduit containing the auxiliary valve for moving the auxiliary valve in accordance with said temperature variations.

23. In a mixing valve, a casing, a mixing chamber therein, a plurality of passageways in said casing for conducting fluids to said chamber, means for regulatably establishing a desired flow of the fluids in each passageway, and means for maintaining a substantially constant temperature in said chamber by changing the established flow in each passageway in response to temperature variations therein.

In testimony whereof I affix my signature.

FREDERICK C. LEONARD.